J. A. TILDEN.
HYDRAULIC SYSTEM.
APPLICATION FILED MAR. 7, 1912.

1,144,446.

Patented June 29, 1915.

Witnesses:
James E. Lynch.
John D. Martin.

Inventor
James A. Tilden

UNITED STATES PATENT OFFICE.

JAMES A. TILDEN, OF BOSTON, MASSACHUSETTS.

HYDRAULIC SYSTEM.

1,144,446.

Specification of Letters Patent. Patented June 29, 1915.

Application filed March 7, 1912. Serial No. 682,255.

*To all whom it may concern:*

Be it known that I, JAMES A. TILDEN, a citizen of the United States, residing at Boston, in the county of Suffolk and State of Massachusetts, have invented a new and useful Hydraulic System, of which the following is a specification.

In apparatus for the controlling and measuring of fluids, as in the proportional meter of my Patent No. 797,027, Aug. 15, 1905, and the fire-service system of my Patent No. 971,510, Sept. 27, 1910, it may be desirable to divert from a main conduit through a secondary conduit a predetermined portion of the total flow. This is conveniently accomplished by a resistance device in the form of a diaphragm provided with an opening of suitable size, such diaphragm being situated in the main conduit at the opposite side of the opening into the secondary conduit from the fluid-source. When this arrangement is employed in connection with systems of the nature of that disclosed in my Patent No. 971,510, previously mentioned, the user is liable to encounter the requirements of fire-underwriters that the main conduit, through which water for extinguishing fires may be drawn, shall be practically unobstructed. This leads to the necessity of increasing the diameter of the resistance-opening until it ceases to be effectual in diverting the desired flow. The present invention overcomes this difficulty.

Figure 2:
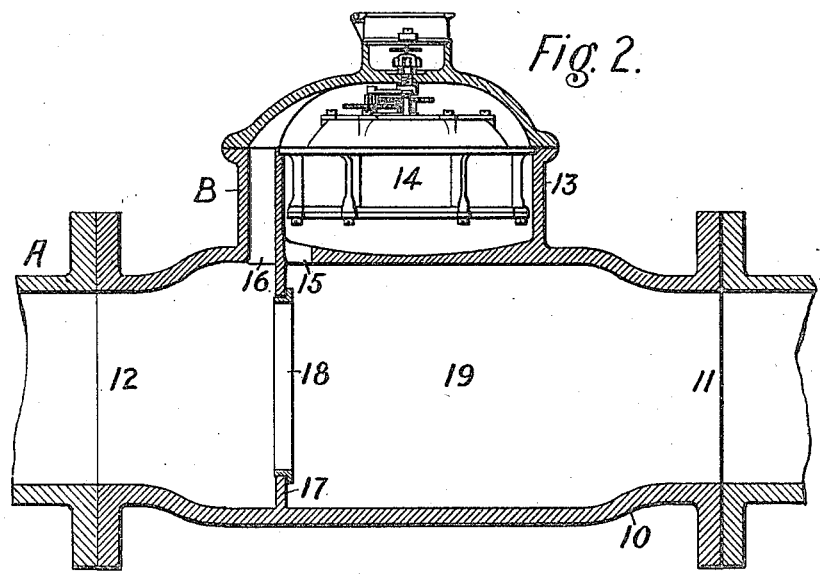
Figure 1:
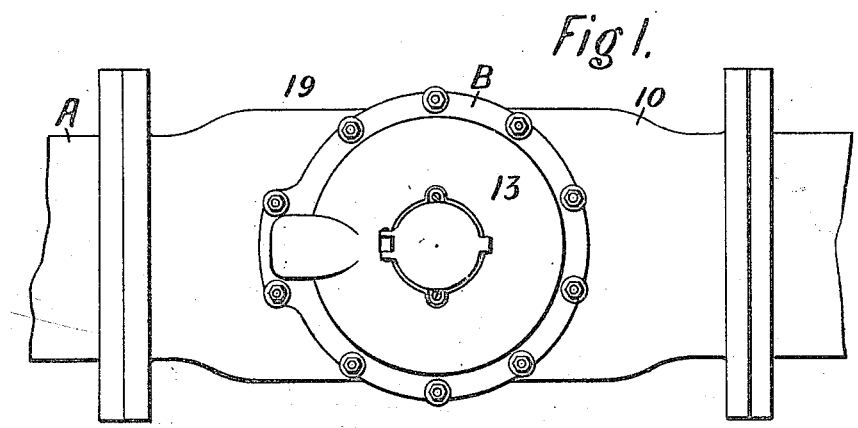

In the accompanying drawing, Figure 1 shows in top plan view one embodiment of my invention, it being applied to a proportional meter, and Fig. 2 is a central vertical longitudinal section therethrough.

The character A designates a main pipe or conduit, in which is included by means of standard connections a proportional meter B. The casing of the meter comprises a main conduit-section 10 provided with inlet and outlet-passages 11 and 12, respectively, equal in cross-sectional area to the corresponding normal dimension of the conduit A. Above the casing-section 10 is a chamber 13 for a tally-meter or measuring apparatus 14 of any convenient type, this chamber furnishing a secondary conduit or by-pass having, with respect to the main conduit, an induction-opening 15 and an eduction opening 16. Between the by-pass openings is a resistance device consisting of a transverse partition or diaphragm 17, in which is a fixed and unobstructed opening 18 closely approximating in diameter that of the main conduit. This resistance device and the by-pass openings are situated in a gradually expanded portion or chamber 19 of the meter-casing 10, the caliber or cross-sectional area of such chamber being greater than that of the passages 11 and 12 and therefore than that of the main in which the meter is used. As illustrated, the resistance device lies across the chamber 19 near the outlet-passage 12, and the induction and eduction-openings of the measuring chamber are in close proximity to the partition.

In the proportions illustrated in the drawings, or those which are necessary in practice, the resistance device would not cause such a flow to traverse the by-pass as would satisfactorily operate a commercial meter; but when the fluid enters the expanded portion 19 from the main conduit the gradual increase in area reduces its velocity, causing the kinetic energy of flow to be transformed in part into static energy, the abrupt change in direction due to the position of the induction-opening 15 immediately above the face of the diaphragm against which the current strikes augmenting this. Consequently the pressure at the opening 15 is considerably above what it is in the normal portion of the main conduit. Moreover, the proximity of the eduction-opening 16 to the opposite side of the diaphragm produces a negative or suction head, causing an aspirating effect. This increased pressure at the induction-opening 15, attributable to the expanded chamber 19 and the relation in said chamber of the opening 15 to the diaphragm, and decreased pressure at the eduction-opening resulting, from the location of the opening 16 with respect to the diaphragm, added to the loss of static pressure between the openings 15 and 16 due to the resistance device, leads to a measurable flow through the by-pass, and it will be seen that this increase is obtained without further obstructing the main conduit.

To show the results attained by my invention, it may be said that with a main conduit having a diameter of six inches, a proportional meter provided with a diaphragm-opening five and one quarter inches in diameter and an expanded portion or static chamber eight inches in diameter, and assuming one thousand gallons per minute flowing, the difference in pressure between the induction and eduction openings of the by-pass due to the resistance device is one pound and that consequent upon the transformation of kinetic into static energy in the chamber 19 is one-half pound at the induction-opening 15, giving one and one-half pounds differential pressure effective through the measuring apparatus 14. This addition of fifty per cent. to the pressure previously available insures satisfactory operation.

I claim:

1. A proportional meter having a section of greater caliber than the main in which the meter is used, said section provided with a diaphragm having a fixed and unobstructed opening for the flow, and a by-pass around the diaphragm having a tally-meter therein.

2. A proportional meter having standard connections at either end for a main of fixed size and an intermediate section of greater caliber, the latter provided with a diaphragm having a fixed and unobstructed opening for the flow, and a by-pass around the diaphragm having a tally-meter therein.

3. A proportional meter having a gradually expanded section of greater caliber than the main in which the meter is used, said section provided with a diaphragm having a fixed and unobstructed opening for the flow, and a by-pass around the diaphragm having a tally-meter therein.

Signed at Boston, in the county of Suffolk and State of Massachusetts, this sixth day of March 1912.

JAMES A. TILDEN.

Witnesses:
HENRY D. MINTON,
FRANCIS G. HERSEY, Jr.